US010617255B2

(12) United States Patent
Pugliese

(10) Patent No.: US 10,617,255 B2
(45) Date of Patent: Apr. 14, 2020

(54) BEVERAGE PREPARATION MACHINE

(71) Applicant: NESTEC S.A., Vevey (CH)

(72) Inventor: Alexandre Pugliese, Paudex (CH)

(73) Assignee: Societe des Produits Nestle S.A., Vevey (CH)

( * ) Notice: Subject to any disclaimer, the term of this patent is extended or adjusted under 35 U.S.C. 154(b) by 351 days.

(21) Appl. No.: 15/538,752

(22) PCT Filed: Dec. 17, 2015

(86) PCT No.: PCT/EP2015/080333
§ 371 (c)(1),
(2) Date: Jun. 22, 2017

(87) PCT Pub. No.: WO2016/102331
PCT Pub. Date: Jun. 30, 2016

(65) Prior Publication Data
US 2018/0000281 A1 Jan. 4, 2018

(30) Foreign Application Priority Data
Dec. 24, 2014 (EP) .................................... 14200306

(51) Int. Cl.
A47J 31/44 (2006.01)
A47J 31/52 (2006.01)

(52) U.S. Cl.
CPC ........... A47J 31/4403 (2013.01); A47J 31/52 (2013.01)

(58) Field of Classification Search
CPC ...... A47J 31/002; A47J 31/4492; A47J 31/52; G06F 3/0414; G06F 3/0488; G06F 3/044;
(Continued)

(56) References Cited

U.S. PATENT DOCUMENTS 5,004,913 A * 4/1991 Kleinerman ............. G01J 5/08
250/227.21
2011/0315711 A1 12/2011 Hecht et al.
(Continued)

FOREIGN PATENT DOCUMENTS

EP 1867261 12/2007
GB 2451508 2/2009
WO 2013160278 10/2013

Primary Examiner — Tu B Hoang
Assistant Examiner — Vy T Nguyen
(74) Attorney, Agent, or Firm — K&L Gates LLP

(57) ABSTRACT

A food or beverage preparation machine (1) comprising a control panel (5), said control panel (5) comprising an actuator (5x) for setting at least one beverage preparation parameter to a predetermined value and a controlling unit for controlling the functioning of the food or beverage preparation machine (1), the food or beverage preparation machine (1) comprising in association with said actuator (5x): a light emitting device (6x) for emitting a light beam, an element for reflecting the light beam that has been emitted by the light emitting device (6x), the position of the reflecting element being modified when a press action (F) is applied to the actuator (5x), a coupler (8x) for generating an interference signal based on the emitted light beam and the reflected light beam, a value of at least one parameter of the interference signal depending on the position of the reflecting element, and a light sensor (7x) for detecting the interference signal, said light sensor being electronically connected with the controlling unit, the controlling unit being configured for detecting a press action applied to the actuator (5x) based on the value of the at least one parameter of the interference signal so as to set at least one food or beverage preparation parameter.

13 Claims, 3 Drawing Sheets

(58) Field of Classification Search
CPC ........... G06F 3/045; G06F 2203/04104; G06F 2203/04105; G06F 2203/04101; H01H 2231/012; H01H 2223/002; H01H 13/807; H01H 13/83; H01H 2219/052; H01H 2219/054; H01H 2219/06; H01H 2221/02; H01H 2223/004; H01H 3/24; H01H 9/161; H01H 2219/014; H01H 2219/062; H01H 2223/038; H01H 2229/046; H01H 13/14; H01H 13/705; H01H 2209/006; H01H 2223/054; H01H 3/12; G02B 17/086; G02B 19/00; G02B 19/0028; G02B 19/0076; G02B 3/00; G02B 6/4298; B67D 3/0006; B67D 1/0078
USPC .......... 99/280, 281, 283, 282, 285; 426/115, 426/590, 431; 222/1, 52, 129, 505; 250/227, 458, 577

See application file for complete search history.

(56) References Cited

U.S. PATENT DOCUMENTS

| | | | |
|---|---|---|---|
| 2013/0098940 A1* | 4/2013 | Bem | A47K 5/1217 222/1 |
| 2014/0134299 A1* | 5/2014 | Guidorzi | A47J 31/4492 426/87 |
| 2016/0280454 A1* | 9/2016 | Mills | A61J 3/002 |

\* cited by examiner

BEVERAGE PREPARATION MACHINE

CROSS REFERENCE TO RELATED APPLICATIONS

The present application is a National Stage of International Application No. PCT/EP2015/080333, filed on Dec. 17, 2015, which claims priority to European Patent Application No. 14200306.0, filed on Dec. 24, 2014, the entire contents of which are being incorporated herein by reference.

FIELD OF THE INVENTION

The present invention concerns a food or beverage preparation machine.

BACKGROUND OF THE INVENTION

Liquid food or beverage preparation machines are well known in the food science and consumer goods areas. Such machines allow a consumer to prepare at home a given type of food or beverage, for instance a coffee-based beverage, such as espresso or filter coffee.

Today, many beverage preparation machines for in-home use comprise a system which can accommodate portioned beverage ingredients. Such portions may be contained typically in pods, sachets or capsules.

The machine comprises a receptacle or cavity for accommodating said portioned beverage ingredients and a fluid injection system for injecting a fluid, such as water, under pressure into the pod or capsule. Thus the fluid, for example hot or cold water, passes through the capsule or pod and delivers a liquid food or beverage.

The beverage preparation machine usually comprises a machine head where the receptacle for accommodating said portioned beverage ingredients is situated, and a machine body containing other functional components of the machine, such as a water pump, a water heater and a controlling unit which manage the functional components of the machine in order to prepare a beverage. The beverage is prepared taking into account beverage preparation parameters of the machine. The values of certain beverage preparation parameters are set by a user of the beverage preparation machine by means of a Human-Machine Interface (HMI).

The Human-Machine Interface comprises a control panel comprising actuators which allow the user to select and/or to set the values of certain beverage preparation parameters. For example, the control panel of current beverage preparation machines may comprise push buttons or tactile touch screen areas by means of which a user may select a recipe from among a plurality of recipes, a fluid volume, a fluid temperature, a pressure or an infusion time. According to the selections made by the user, certain beverage preparation parameters are set to predetermined values.

The Human-Machine Interface also contains electronic circuits and electric/electronic connexions between push buttons and/or tactile touch screen areas of the control panel and the electronic circuits. The user's selections are electronically treated and transmitted to the controlling unit which takes them into account in preparing the beverage.

The Human-Machine Interface is positioned in the machine head, close to the receptacle or cavity for accommodating the portioned beverage ingredients and where the fluid, such as water, is injected.

Therefore, due to the proximity of the Human-Machine Interface and the receptacle where fluid is injected, fluid flows close to the Human-Machine Interface. Even if beverage preparation machines are designed to avoid fluid leakage, in the event of leakage, electrical components may be in contact with the fluid which could lead to a short circuit that damages the beverage preparation machines which is of course undesirable.

It is therefore an object of the present invention to provide a food or beverage preparation machine which resolves at least some of the above difficulties making it possible to improve in the prevention of short circuits and thus to provide additional safety for users manipulating the interface system of the food or beverage preparation machine.

SUMMARY OF THE INVENTION

In a first aspect of the invention, there is provided a food or beverage preparation machine, comprising a control panel, the control panel comprising an actuator for setting at least one food or beverage preparation parameter of the food or beverage preparation machine to a predetermined value and a controlling unit for controlling the functioning of the food or beverage preparation machine, the food or beverage preparation machine comprising in association with said actuator:
- a light emitting device for emitting a light beam,
- an element for reflecting the light beam that has been emitted by the light emitting device, the position of the reflecting element being modified when a press action is applied to the actuator,
- a coupler (or coupling device) for generating an interference signal based on the emitted light beam and the reflected light beam, a value of at least one parameter of the interference signal depending on the position of the reflecting element, and
- a light sensor for detecting the interference signal, said light sensor being electronically connected with the controlling unit, the controlling unit being configured for detecting a press action applied to the actuator based on the value of the at least one parameter of the interference signal so as to set at least one food or beverage preparation parameter.

Thus, a press action applied to the actuator causes a modification of the position of the reflecting element, and as a consequence, a value of at least one parameter (for example, the amplitude) of the interference signal is modified. The controlling unit, which is connected to the light sensor detecting the interference signal, is able to detect whether a press action has been applied to the actuator based on the value of the at least one parameter of the interference signal.

By virtue of the functioning of these elements of the food or beverage preparation machine, the light emitting device, the coupler, the light sensor and the controlling unit may be positioned at a distance from the actuator.

Therefore, the control panel of the food or beverage preparation machine may be positioned such that the light emitting device, the light sensor, the coupler and the controlling unit are distant from the control panel which is a part of the food or beverage preparation machine which is accessible for a user of the beverage preparation machine. In a case of a beverage preparation machine in which the control panel is situated close to the receptacle for accommodating portioned beverage ingredients in which the fluid is injected, the light emitting device, the light sensor and the controlling unit are situated at a distance from this receptacle. Thus the risk of a short circuit caused by a fluid coming into contact with an electric/electronic circuit is reduced.

According to an embodiment, the food or beverage preparation machine comprises a first light guide connecting the light emitting device and the reflecting element through the coupler, and a second light guide connecting the coupler and the light sensor for transmitting the interference signal to the light sensor.

According to an embodiment, the first light guide is disposed for transmitting the light beam emitted by the light emitting device to the reflecting element, the light beam passing through the coupler, and for transmitting the reflected light beam from the reflected element to the coupler.

Thus, the light beam emitted by the light emitting device arrives at the reflecting device and is reflected. The reflected light beam is next transmitted to the coupler through the first light guide. The light beam and the reflected light beam pass through the coupler which generates the interference signal which is transmitted to the light sensor.

According to another embodiment, the food or beverage preparation machine comprises a third light guide connecting the reflecting element and the coupler for transmitting the reflected light beam from the reflected element to the coupler, the first light guide transmitting the light beam emitted by the light emitting device to the reflecting element, the light beam passing through the coupler.

In such an embodiment, the light beam and the reflected light beam are transmitted through different light guides.

According to an embodiment, the food or beverage preparation machine comprises a light source and a light guide connecting the light source with the actuator, for transmitting light emitted by the light source to the actuator.

Thus, when a user applies a press action to the actuator or pushes the actuator, the inner surface of the actuator and the reflecting element are displaced.

According to an embodiment, the light guides comprise optic fibers, the light emitting device comprises a laser diode and the light sensor comprises a photodiode.

According to an embodiment, the reflecting element comprises a reflective surface situated at an inner surface of the actuator, an outer surface of the actuator being configured for receiving a press action of a user.

According to an embodiment, an outer surface of the actuator is at least partially transparent.

In this embodiment, the transparent surface may be illuminated by light originating from the light source.

According to an embodiment, the food or beverage preparation machine comprises a machine head having a receptacle for accommodating a portioned beverage ingredient and in which a fluid is injected for preparing food or a beverage and a machine body comprising functional components, and wherein said control panel is situated at said machine head and the light emitting device, the coupler and the light sensor are situated at said machine body.

Thus, in the food or beverage preparation machine, the light emitting device, the light sensor and the coupler are not situated close to the receptacle where a liquid is injected in order to prepare food or a beverage.

According to an embodiment, the machine head and the machine body are separated by a leak-tight wall.

Therefore, the safety in such a food or beverage preparation machine is further improved.

According to an embodiment, the at least one parameter of the interference signal is the amplitude of the interference signal.

Thus, the value of the amplitude of interference signal depends on the position of the reflecting element, and the controlling unit may detect a press action applied to the actuator based on the value of the amplitude of the interference signal.

According to a second aspect of the invention, there is provided an interface system for a food or beverage preparation machine comprising a control panel comprising an actuator for setting at least one food or beverage preparation parameter of the food or beverage preparation machine to a predetermined value, comprising in association with said actuator:
  a light emitting device for emitting a light beam,
  an element for reflecting the light beam that has been emitted by the light emitting device, the position of the reflecting element being modified when a press action is applied to the actuator,
  a coupler or coupling device for generating an interference signal based on the emitted light beam and the reflected light beam, a value of at least one parameter of the interference signal depending on the position of the reflecting element, and
  a light sensor for detecting the interference signal, which is electronically connected with a controlling unit which controls the functioning of the food or beverage preparation machine and which is configured for detecting a press action applied to the actuator based on the value of the at least one parameter of the interference signal so as to set at least one food or beverage preparation parameter.

The advantages of the interface system are similar to those of the food or beverage preparation machine.

As used in this specification, the words "comprises", "comprising", and similar words, are not to be interpreted in an exclusive or exhaustive sense. In other words, they are intended to mean "including, but not limited to.

BRIEF DESCRIPTION OF THE DRAWINGS

Additional features and advantages of the present invention are described in, and will be apparent from, the description of the presently preferred embodiments which are set out below with reference to the drawings in which.

DETAILED DESCRIPTION OF THE INVENTION

The invention is further described with reference to the following examples. It will be appreciated that the invention as claimed is not intended to be limited in any way by these examples.

Figure 1:
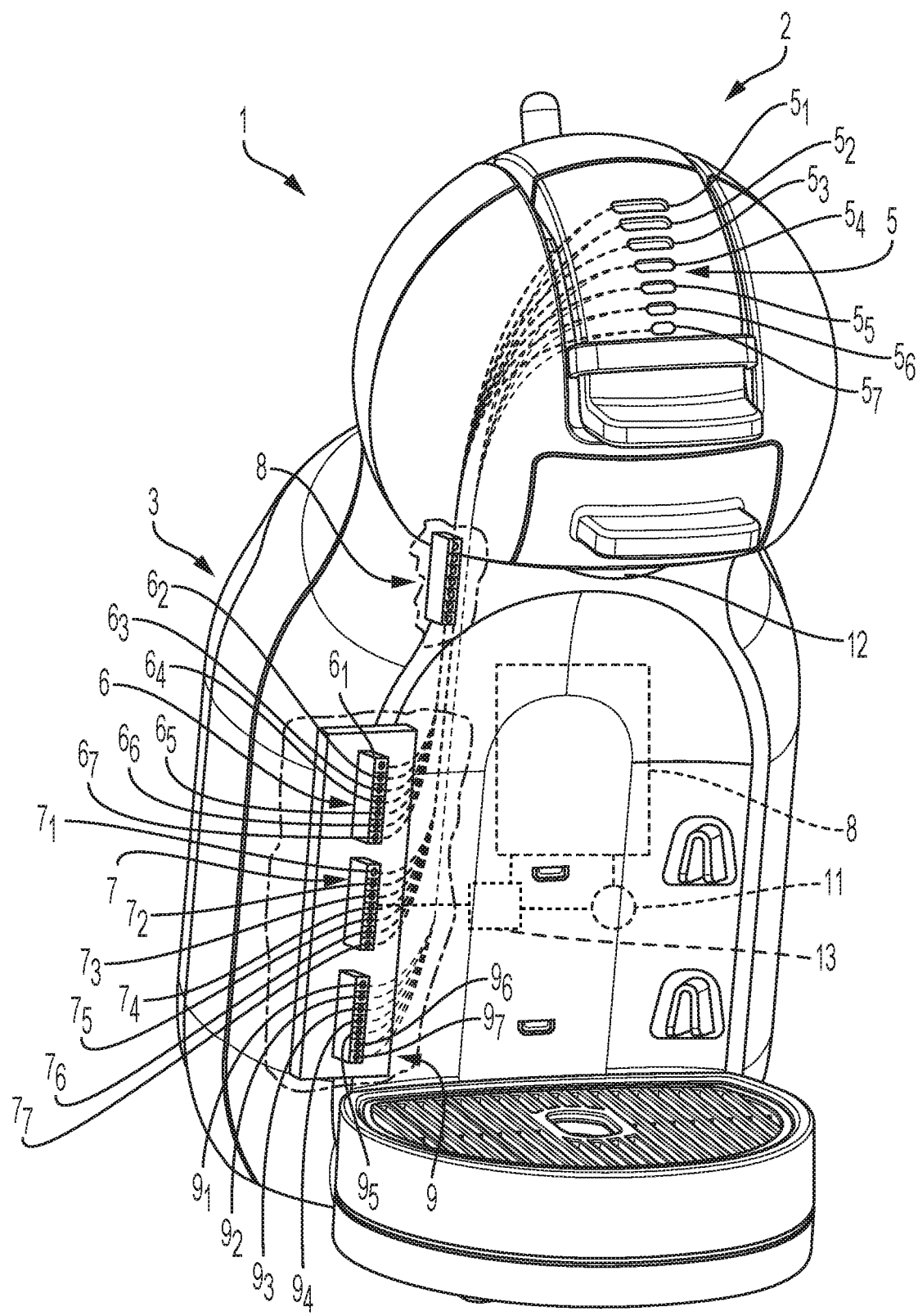
FIG. 1 illustrates a beverage preparation machine according to an embodiment the invention.

FIG. 1 illustrates a liquid food or beverage preparation machine 1 according to one embodiment. The beverage preparation machine 1 comprises a machine head 2 and a machine body 3.

To simplify the description, the food or beverage preparation machine 1 will be named below as beverage preparation machine 1. However, the present invention is also suitable for preparing food.

The beverage preparation machine 1 comprises a receptacle 14 for accommodating portioned beverage ingredients and a fluid injection system (not illustrated in the drawings) for injecting a fluid into the receptacle when preparing a beverage. The receptacle 14 and the fluid injection system are positioned at the machine head 2.

The beverage preparation machine 1 comprises a control panel 5 allowing a user to command the preparation of a beverage and to set the values of certain beverage preparation parameters.

For example, a user may select a recipe, a volume or a temperature respectively from among a set of recipes, a set of volumes or a set of temperatures. Thus, a beverage preparation parameter is set to a predetermined value which depends on the selection made by the user.

The control panel 5 is situated at the machine head 2 such that it is accessible to a user of the beverage preparation machine 1.

The control panel 5 comprises at least one actuator $5_1, 5_2 \ldots 5_7$ for setting at least one beverage preparation parameter to a predetermined value.

For example, when a user applies a press action to an actuator $5x$ or pushes the actuator $5x$, at least one beverage preparation parameter is set to a predetermined value.

In the represented embodiment, the control panel 5 comprises a set of actuators $5_1, 5_2, \ldots 5_7$ forming a selection device, for selecting, for example, a volume for the beverage to be prepared from among a set of volumes. Thus, in this example, each actuator $5x$ from among the set of actuators $5_1, 5_2, \ldots 5_7$ is associated with a predetermined value of volume.

Of course, the control panel 5 may comprise actuators for setting other beverage preparation parameters, such as a temperature, a pressure, an infusion time, a recipe, or an actuator for turning the machine on and off.

The beverage preparation machine 1 also comprises a set of light emitting devices 6, each light emitting device $6_1, 6_2, \ldots 6_7$ being associated with a respective actuator $5_1, 5_2, \ldots 5_7$.

The beverage preparation machine 1 also comprises a set of light sensors 7, and a set of couplers 8.

Each light sensor $7_1, 7_2 \ldots 7_7$, and each coupler $8_1, 8_2, \ldots 8_7$ is associated with a respective actuator $5_1, 5_2 \ldots 5_7$.

The set of light emitting devices 6, the set of couplers 8 and the set of light sensors 7 are positioned at the machine body 3, at a distance from the control panel 5.

According to an embodiment, the light emitting devices $6_1, 6_2, \ldots 6_7$, the couplers $8_1, 8_2, \ldots 8_7$, the light sensors $7_1, 7_2, \ldots 7_7$ and the reflecting element, which is situated at the actuator $5x$ in the described embodiment, communicate together by light guides, such as optic fibers.

The beverage machine 1 further comprises a set of light sources 9, each light source $9_1, 9_2, \ldots 9_7$ of the set of light sources 9 being associated with a respective actuator of the set of actuators $5_1 \ldots 5_7$.

The set of light sources 9 is positioned at the machine body 3, at a distance from the control panel 5.

Each light source $9_1, 9_2, \ldots 9_7$ illuminates a part of the control panel 5 corresponding to the actuator $5_1 \ldots 5_7$ associated with the light source $9_1, 9_2, \ldots 9_7$ when an action, for example a press action, is applied to the actuator $5x$.

According to an embodiment, the light source $9_1, 9_2, \ldots 9_7$ comprises at least one light-emitting diode (LED).

The light source $9_1, 9_2, \ldots 9_7$ is connected with the actuator $5_1, 5_2, \ldots 5_7$ by a light guide, such as an optic fiber, for transmitting the light emitted by the light source $9x$ to the actuator $5x$.

The functioning and interactions of the elements presented above will be described in reference to FIG. 2.

At the machine body 3, the beverage preparation machine 1 comprises functional components, such as a water pump 11 and a water heater 8, and a controlling unit 13 for managing the functional components in order to prepare a beverage.

The controlling unit is electrically connected with the light sensors $7_1, 7_2 \ldots 7_7$ and is configured for detecting, based on signals originating from the light sensors $7_1, 7_2 \ldots 7_7$, a press action that a user has applied to an actuator $5x$ in order to select a predetermined value for at least one beverage preparation parameter.

The controlling unit sets at least one beverage preparation parameter to a predetermined value when the at least one actuator $5_1, 5_2, \ldots 5_7$ receives a press action from a user.

Thus, a beverage is prepared taking into account beverage preparation parameters, certain of them being set by a user of the beverage preparation machine 1.

In the represented embodiment, a user may select a volume value for a beverage by means of the control panel 5. For example, the user may select a value by applying an action, such as a press action, to one of the actuators $5_1, 5_2, \ldots 5_7$ of the set of actuators 5.

Depending on the selected value, the controlling unit set a beverage preparation parameter relative to the volume of beverage to a predetermined value.

According to an embodiment, the machine head 2 and the machine body 3 are separated by a leak-tight wall 12.

By virtue of the leak-tight wall, the electric/electronic elements situated in the machine body 3 are isolated from elements in the machine head 2, in particular from the control panel 5, which is in contact with a user and which may be in contact with a fluid in an event of leakage.

Thus, this leak-tight wall separating the machine head 2 and the machine body 3 provides an additional safety measure for users manipulating the control panel 5.

Figure 2:
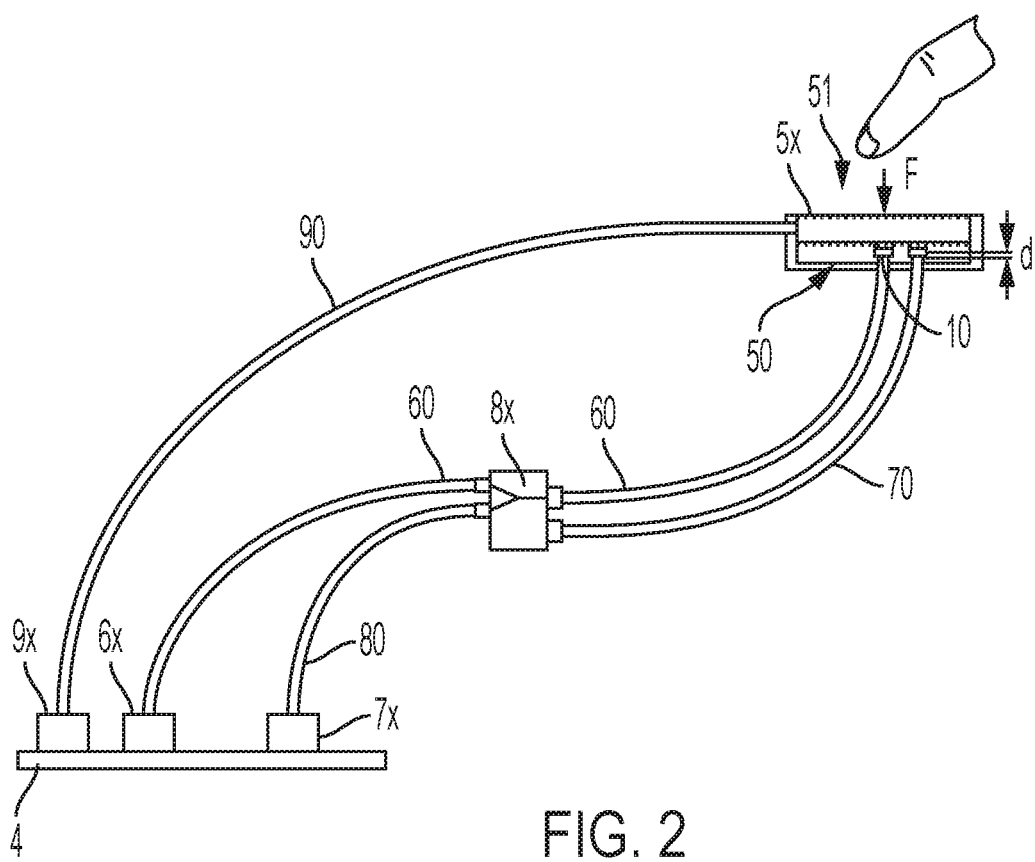
FIG. 2 illustrates a scheme representing a section view of a part of the machine comprising the control panel and elements in association therewith, according to an embodiment of the invention.

FIG. 2 illustrates a scheme of a section view of a control panel and elements interacting with the control panel.

In this Figure, there can be seen a single actuator $5x$, a single light emitting device $6x$, a single coupler $8x$, a single light sensor $7x$, and a single light source $9x$. The light emitting device $6x$, the coupler $8x$, the light sensor $7x$ and an element for reflecting light 10 are associated with the actuator $5x$.

The light emitting device $6x$, the coupler $8x$, the light sensor $7x$, and the light source $9x$ are placed for example in a chip board 4.

It should be noted that the beverage preparation machine 1 comprises in general a set of actuators, a set of light emitting devices, a set of couplers, a set of light sensors and a set of light sources, each actuator being respectively associated with a light emitting device, a coupler, a light sensor and a light source, such as in the embodiment described with reference to FIG. 1.

The light emitting device $6x$ emits a light beam, the element for reflecting light 10 reflects the light beam that has been emitted by the light emitting device $6x$, the coupler $8x$ generates a signal which is named "interference signal" and which is generated based on the emitted light beam and the reflected light beam, and the light sensor $7x$ detects the interference signal and converts the detected interference signal into an electrical signal.

According to an embodiment, the generated interference signal is generated by superposing the emitted light beam and the reflected light beam.

The light emitting device 6x and the reflecting element 10 are connected by a first light guide 60 through the coupler 8x, and the coupler 8x and the light sensor 7x are connected by a second light guide 80.

The second light guide 80 transmits the interference signal from the coupler 8x to the light sensor 7x.

According to an embodiment, the first light guide 60 transmits the light beam emitted by the light emitting device 6x to the reflecting element 10 and the reflected light beam from the reflected element 10 to the coupler 8x.

According to another embodiment, a third light guide 70 connects the reflecting element 10 and the coupler 8x for transmitting the reflected light beam from the reflected element 10 to the coupler 8x. In this embodiment, the first light guide 60 only transmits the light beam emitted by the light emitting device 6x to the reflecting element 10.

The light source 9x is connected with the actuator 5x by a light guide 90 which transmits the light emitted by the light source 9x to the actuator 5x.

According to an embodiment, the reflecting element 10 is a reflective surface, such as a mirror, situated at an inner surface 50 of the actuator 5x.

According to the embodiment described with reference to FIG. 2, the actuator 5x comprises a rigid button. The actuator 5x is at least partially transparent and comprises an outer surface 51 which may be illuminated by the light originating from a light source 9x. The outer surface 51 is configured for receiving a press action F of a user.

According to another embodiment, the actuator 5x comprises a flexible button.

For example, the light guides comprise optic fibers, the light emitting device comprises a laser diode and the light sensor is a photodiode.

When a press action F is applied to the actuator 5x, the position of the reflecting element 10 is modified.

The phase of the reflected light beam depends on the position of the reflecting element 10. As a consequence, the difference in the phase of the emitted light beam and the reflected light beam depends on the position of the reflecting element 10.

For example, when the actuator 5x is in a relaxed position the emitted light beam and the reflected light beam are in phase, i.e. no phase shift is introduced in the reflected light beam with respect to the emitted light beam. At the contrary, when a press action F is applied to the actuator 5x the reflected light beam undergoes a phase shift with respect to the emitted light beam.

Thus, the interference signal is different when a press action F is applied to the actuator 5x compared to when no press action is applied to the actuator 5x (i.e. when the actuator 5x is situated in a relaxed position).

It may be noted that when the actuator 5x is situated in a relaxed position, the emitted light beam and the reflected light beam have a same phase, i.e. they are in phase.

Figure 3:
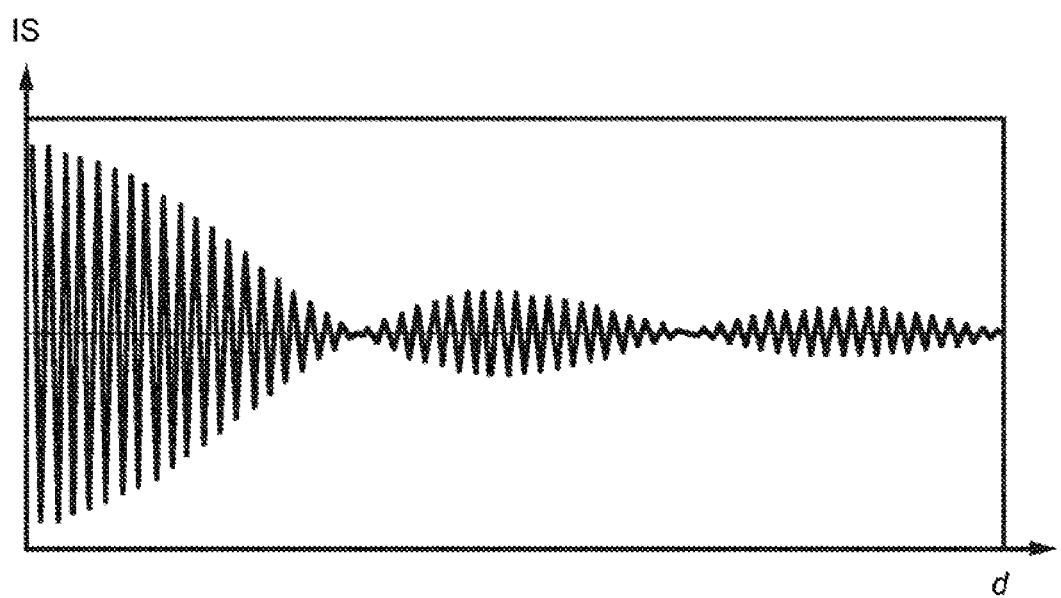
FIG. 3 represents an example of an interference signal generated on the basis of the emitted light beam and the reflected light beam.
Figure 4:
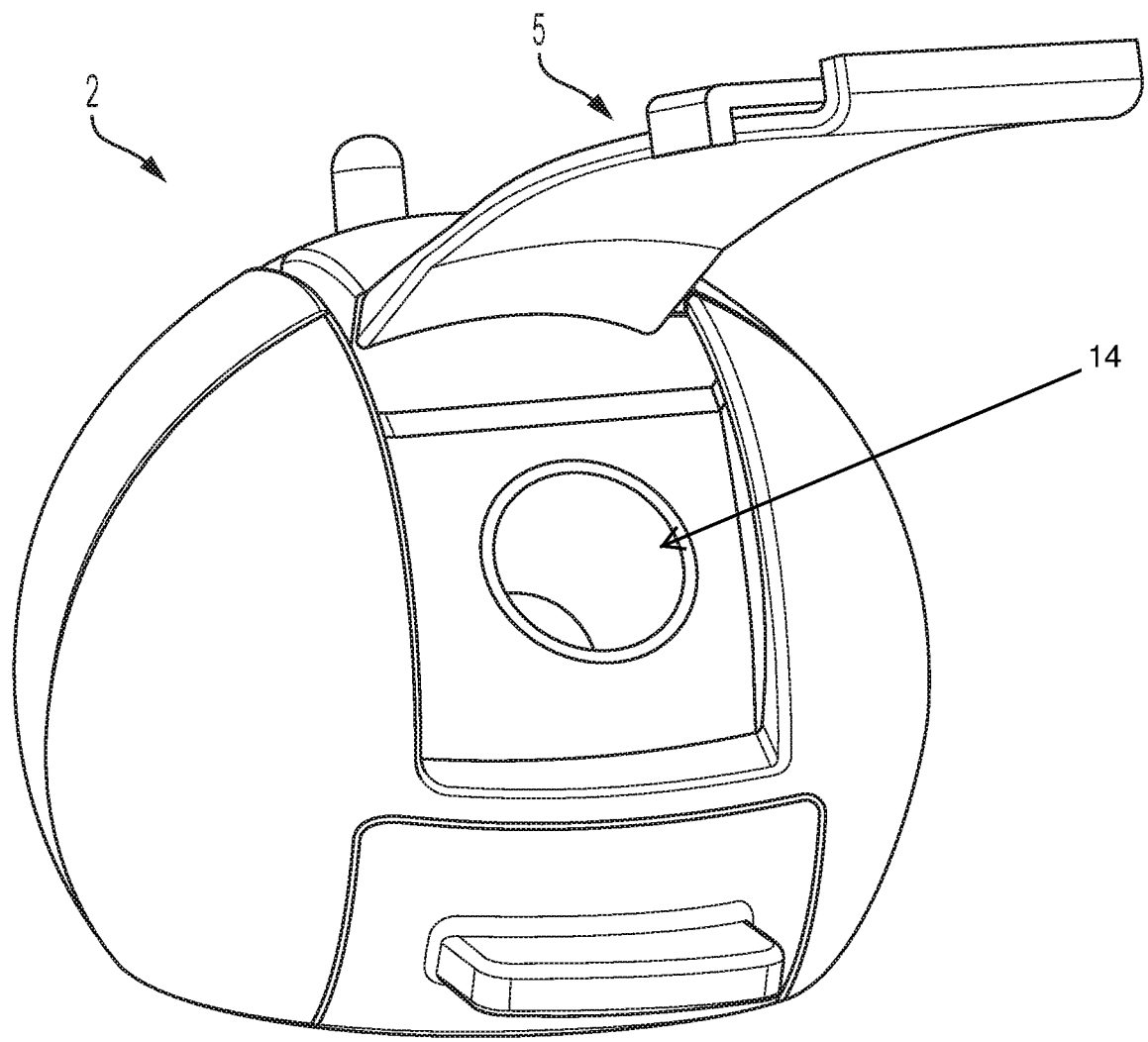
FIG. 4 illustrates a beverage machine head according to an embodiment of the invention.

FIG. 3 represents an example of interference signal IS generated on the basis of the emitted light beam and the reflected light beam as a function of the displacement "d" suffered by the reflecting element 10 when a press action F is applied to the actuator 5x, the displacement "d" being measured from the relaxed position of the actuator 5x.

According to an embodiment, the generated interference signal IS is generated by superposing the emitted light beam and the reflected light beam.

A value of at least one parameter of the interference signal IS depends on the position of the reflecting element 10.

Such a parameter can be for instance the amplitude of the interference signal IS, the frequency, or any other physical characteristic of the interference signal, that varies depending on the position of the reflecting element 10.

For example, if the at least one parameter of the interference signal IS is the amplitude, for each value of the displacement d corresponds to the sum of the amplitudes of the emitted light beam and the reflected light beam.

The generated interference signal IS is detected by the light sensor 7x which converts the interference signal IS in an electrical signal, for example an electric current or a voltage.

The light sensor 7x being electronically connected with the controlling unit, communicates this generated electrical signal to the controlling unit.

It should be noted that the electrical signal that has been generated by the light sensor 7x represents the detected interference signal IS.

On the basis of a value of at least one parameter of the electrical signal, the controlling unit detects whether a press action F has been applied to the actuator.

In the described embodiment, the at least one parameter of the electrical signal is the amplitude of the electrical signal.

Of course, the at least on parameter may be different, for example, the phase or the frequency of the electrical signal.

When a user applies a press action to an actuator 5x, the controlling unit detects this press action F and sets a beverage preparation parameter accordingly.

Also, the controlling unit commands the light source 9x to switch-on. The light originating from the light source 9x is transmitted by the light guide 90 to the actuator 5x, the actuator 5x appearing thereby illuminated.

Once the actuator 5x has been illuminated, the user may notice that the press action F applied in order to, for example, set a beverage preparation parameter to a value, has been taken into account.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

The invention claimed is:

1. A food or beverage preparation machine comprising a machine head, a machine body, a controller and a control panel, the control panel comprises a plurality of actuators, the control panel is configured for a user to select a volume value, and each of the actuators is associated with a different volume value than the other actuators, the food or beverage preparation machine further comprising:
   a light emitting device configured to emit;
   a reflecting element configured to reflect the light beam emitted by the light emitting device, a first light guide connecting the light emitting device to the reflecting element, the first light guide comprises first optic fibers, a position of the reflecting element configured to change when a press action (F) is applied to said plurality of actuators;
   a coupler configured to generate an interference signal based on the emitted light beam and the reflected light beam, a value of at least one parameter of the interference signal depending on the position of the reflecting element;

wherein the light beam emitted by the light emitting device is transmitted to the reflecting element and from the reflecting element to the coupler;

a light sensor configured to detect the interference signal, a second light guide connecting the coupler and the light sensor, the second light guide configured to transmit the interference signal to the light sensor, the second light guide comprises second optic fibers, the light sensor is configured to convert the interference signal into an electrical signal, the light sensor is electronically connected to the controller and configured to communicate the electrical signal to the controller, the controller is configured to detect the press action (F) applied to the plurality of actuators based on the value of the at least one parameter of the interference signal so as to set at least one food or beverage preparation parameter; and wherein the plurality of actuators of the control panel and the reflecting element are situated at a machine head, and wherein the controller, the light emitting device, the coupler and the light sensor are situated at a machine body.

2. The food or beverage preparation machine according to claim 1, wherein the first light guide is positioned to transmit the light beam emitted by the light emitting device through the coupler to the reflecting element, and the first light guide is configured to transmit the reflected light beam from the reflecting element to the coupler.

3. The food or beverage preparation machine according to claim 1, comprising a third light guide connecting the reflecting element and the coupler, the third light guide configured to transmit the reflected light beam from the reflecting element to the coupler, the first light guide configured to transmit the light beam emitted by the light emitting device through the coupler to the reflecting element.

4. The food or beverage preparation machine according to claim 1, comprising a second light emitting device connected to the plurality of actuators, the second light emitting device configured to transmit light emitted by the second light emitting device to the plurality of actuators.

5. The food or beverage preparation machine according to claim 1, wherein the light emitting device comprises a laser diode and the light sensor comprises a photodiode.

6. The food or beverage preparation machine according to claim 1, wherein the reflecting element comprises a reflective surface situated at an inner surface of the plurality of actuators, and an outer surface of the plurality of actuators is configured to receive the press action (F) of the user.

7. The food or beverage preparation machine according to claim 1, wherein an outer surface of the plurality of actuators is at least partially transparent.

8. The food or beverage preparation machine according to claim 1, wherein the machine head has a receptacle for accommodating a portioned beverage ingredient and in which a fluid is injected for preparing food or a beverage, and the machine body comprises a water heater and a water pump.

9. The food or beverage preparation machine according to claim 1, wherein the machine head and the machine body are separated by a leak-tight wall.

10. The food or beverage preparation machine according to claim 1, wherein the at least one parameter of the interference signal is an amplitude of the interference signal.

11. An interface system for a food or beverage preparation machine comprising a control panel comprising a plurality of actuators, the control panel is configured for a user to select a volume value, and each of the actuators is associated with a different volume value than the other actuators, the food or beverage preparation machine comprising:

a light emitting device configured to emit a light beam, a reflecting element configured to reflect the light beam emitted by the light emitting device, a first light guide connecting the light emitting device to the reflecting element, the first light guide comprises first optic fibers, a position of the reflecting element configured to change when a press action is applied to the plurality of actuators, a coupler configured to generate an interference signal based on the emitted light beam and the reflected light beam, a value of at least one parameter of the interference signal depending on the position of the reflecting element;

wherein the light beam emitted by the light emitting device is transmitted to the reflecting element and from the reflecting element to the coupler;

a light sensor configured to detect the interference signal, a second light guide connecting the coupler and the light sensor, the second light guide configured to transmit the interference signal to the light sensor, the second light guide comprises second optic fibers, the light sensor is configured to convert the interference signal into an electrical signal, the light sensor is electronically connected to a controller and configured to communicate the electrical signal to the controller, the controller is configured to detect the press action applied to the plurality of actuators based on the value of the at least one parameter of the interference signal so as to set at least one food or beverage preparation parameter wherein the plurality of actuators of the control panel and the reflecting element are is situated at a machine head, and wherein the controller, the light emitting device, the coupler and the light sensor are situated at a machine body.

12. The food or beverage preparation machine according to claim 4, wherein the controller is configured to switch-on the second light emitting device and illuminate the plurality of actuators.

13. The food or beverage preparation machine according to claim 1, wherein the at least one parameter of the interference signal is a frequency of the interference signal.

\* \* \* \* \*